(12) United States Patent
Tsuda

(10) Patent No.: US 6,226,492 B1
(45) Date of Patent: May 1, 2001

(54) MOBILE SATELLITE COMMUNICATION METHOD AND SYSTEM CAPABLE OF CARRYING OUT CARRIER ACTIVATION WITH RELIABILITY OF A COMMUNICATION PATH SECURED

(75) Inventor: Hiroki Tsuda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/229,571

(22) Filed: Jan. 13, 1999

(30) Foreign Application Priority Data

Jan. 13, 1998 (JP) ................................................ 10-018042

(51) Int. Cl.[7] .................................................. H04B 7/185
(52) U.S. Cl. .......................... 455/12.1; 455/13.2; 455/502
(58) Field of Search ................................. 455/12.1, 13.1, 455/13.2, 13.3, 427, 428, 429, 430, 502; 370/324, 316, 503, 508, 505, 510; 342/356

(56) References Cited

U.S. PATENT DOCUMENTS

| | | | |
|---|---|---|---|
| 3,711,855 | * 1/1973 | Schmidt et al. | 342/353 |
| 4,470,141 | * 9/1984 | Takada | 370/324 |
| 4,561,099 | * 12/1985 | Atsugi et al. | 375/344 |
| 4,686,673 | * 8/1987 | Hotta | 370/324 |
| 5,241,319 | * 8/1993 | Shimizu | 342/358 |
| 5,613,195 | * 3/1997 | Ooi | 455/13.2 |
| 5,991,589 | * 11/1999 | Nawata | 399/297 |
| 6,127,967 | * 10/2000 | Ghazvinian et al. | 342/354 |

FOREIGN PATENT DOCUMENTS

| | | |
|---|---|---|
| 62-62628 | 3/1987 | (JP) . |
| 1-181336 | 7/1989 | (JP) . |
| 7-167936 | 7/1995 | (JP) . |

OTHER PUBLICATIONS

G. Maral et al., "Satellite Communications Systems—Systems, Techniques and Technology", Second Edition, John Wiley & Sons, pp. 85–86.

Vijay K. Bhargava et al., "Digital Communications By Satellite—Modulation, Multiple Access and Coding", John Wiley & Sons, pp. 225–226.

* cited by examiner

*Primary Examiner*—Nay Maung
*Assistant Examiner*—Sonny Trinh
(74) *Attorney, Agent, or Firm*—Sughrue, Mion, Zinn, Macpeak & Seas, PLLC

(57) ABSTRACT

In a mobile satellite communications system comprising an earth station (10), a mobile station (20) with a mobile antenna (24), and a communication satellite (30) for mediating communications between the earth station and the mobile station, the earth station comprises a carrier frequency variation detecting device (18) for detecting a received carrier frequency due to a doppler effect to produce a frequency variation detected signal. Although an earth signal processing circuit (12) transmits a burst carrier signal or a maintaining burst signal to the mobile station when an information signal such as a speech signal to be transmitted is not supplied thereto, the earth signal processing circuit extends a burst transmission duration for the maintaining burst signal in response to the frequency variation detected signal and it results in making the mobile station easily carry out antenna tracking control. In addition, the earth signal processing circuit continuously transmits the carrier signal when a received frame synchronization is pulled out.

14 Claims, 6 Drawing Sheets

MOBILE SATELLITE COMMUNICATION METHOD AND SYSTEM CAPABLE OF CARRYING OUT CARRIER ACTIVATION WITH RELIABILITY OF A COMMUNICATION PATH SECURED

BACKGROUND OF THE INVENTION

This invention relates to a mobile satellite communication method and a mobile satellite communication system for carrying out communications via a communications satellite between an earth station and a mobile station with an automatic tracking type antenna.

In a satellite communications system, multiplex techniques called multiple accesses are used in order to effectively utilize assigned frequencies and to decrease transmission power up to now. Among the multiple accesses, a frequency division multiple access (FDMA) system, which assigns frequencies for a satellite transponder, is widely used in the satellite communications system presently. This is because the FDMA system can apply technique established in a ground communication, has a low initial cost, and can be relatively easily realized.

However, the FDMA system is disadvantageous in that throughput drastically decrease when the number of channel connection increases. More specifically, when the number of channel connection increases, transmission power in the satellite transponder increases and an amplifier in the transponder may operate at an operating point near to a saturation point thereof. Therefore, intermodulation accompanied with waveform distortion occurs and interference between channels occurs. As a result, quality of a communication path decreases, it is difficult to use the communication path, and throughput drastically decreases. Accordingly, in the satellite communication system of the FDMA system, use is made of carrier activation in order to avoid these problems.

For example, in a case of a satellite communications system offering a transmission service of speech, carrier activation is described by G. Maral, et al. in a book under the title of "SATELLITE COMMUNICATIONS SYSTEM 2nd Edition", John Wiley & Sons, Inc. 1993 or is described by Vijay K. Bhargava, et al., in a book under the title of "DIGITAL COMMUNICATIONS BY SATELLITE", John Wiley & Sons, Inc. 1981. According to these books, as the carrier activation, voice activation is carried out which detects a speech and transmits a carrier signal during a time duration when the speech is detected in a telephone call. In the voice activation, inasmuch as the carrier signal is not transmitted during a pause time duration in the telephone call when the voice is not detect, it is possible to decrease an average transmission power in the satellite and to ensure a channel capacity with intermodulation prevented.

FIGS. 6A and 6B are time charts for showing signals in a case of carrying out the voice activation. FIG. 6A shows a speech signal while FIG. 6B shows a transmission signal. During a time duration Ti when the speech signal is interrupted, sending of the transmission signal (a carrier signal) is basically stopped.

Such carrier activation is applied not only to a case of transmitting a speech signal but also to a case of transmitting a data signal for use in a facsimile equipment or a computer and transmission of the carrier signal is stopped when the data signal to be transmitted is not supplied.

In addition, in the satellite communications system carrying out the carrier activation, as shown in FIG. 6B, a burst carrier signal 102 is periodically transmitted at predetermined time intervals in order to maintain a channel connection state between an earth station and a mobile station when the time duration of a transmission stop is not less than a predetermined time duration with no information signal (no speech signal or no data signal to be transmitted) supplied. Such a burst carrier signal is call a maintaining burst signal.

On the other hand, when the mobile station uses an automatic tracking type antenna as a mobile antenna, the mobile station normally receives a signal from the satellite and carries out a tracking control on the basis of a level of the received signal so as to turn a direction of the mobile antenna toward the satellite. Accordingly, such a mobile station must carry out the tracking control using only the maintaining burst signal during a time duration when the carrier signal from the earth station is interrupted due to the carrier activation. It is difficult to control accurately when a bad condition is piled up.

Particularly in a case of a mobile satellite communications system, the received signal may be not received in stable due to a shadowing which occurs because variation of a transmission condition peculiar to a mobile satellite communication. It is increasingly difficult to carry out the tracking control in such a state. In addition, it is supposed in a mobile station loaded into a vehicle loaded with the automatic tracking type antenna that the mobile station rapidly turns in its moving direction. Under the circumstances, it is impossible to carry out the tracking control using only reception of the maintaining burst signal during operation of the carrier activation. This may cause a case where it is difficult only to maintain a received synchronization.

Therefore, in the mobile satellite communications system, it results in remarkably injuring reliability in a communication path in a case of carrying out the carrier activation.

As a method of avoid this problem, there is a method of always transmitting a tracking exclusive signal from the satellite, and of monitoring a signal level of the tracking exclusive signal in the mobile station. However, inasmuch as this method requires hardware for receiving the tracking exclusive signal and has a large scale of hardware as a whole, this method is unsuitable for the mobile station which requires high mobility.

SUMMARY OF THE INVENTION

It is therefore an object of the present invention to provide a mobile satellite communication method and a mobile satellite communications system which are capable of carrying out carrier activation with reliability in a communication path secured.

Other objects of this invention will become clear as the description proceeds.

A mobile satellite communication method to which the present invention is applicable carries out communications via a communications satellite between an earth station and a mobile station with an automatic tracking type antenna. The earth station transmits, to the mobile station, a modulated signal into which a carrier signal is modulated by an information signal supplied thereto. The mobile satellite communication method carries out carrier activation where the earth station periodically transmits a burst carrier signal having a burst transmission duration to the mobile station when the information signal is not supplied thereto. According to an aspect of this invention, the earth station extends the burst transmission duration for the burst carrier signal when the earth station receives, from the mobile station, a carrier signal having a carrier frequency which varies with variation exceeding a reference value.

A mobile satellite communications system to which the present invention is applicable carries out communications via a communication satellite between an earth station and a mobile station with an automatic tracking type antenna. The earth station transmits, to the mobile station, a modulated signal into which a carrier signal is modulated by an information signal supplied thereto. The mobile satellite communications system carries out carrier activation where the earth station periodically transmits a burst carrier signal having a burst transmission duration to the mobile station when the information signal is not supplied thereto. According to an aspect of this invention, the earth station comprises a carrier frequency variation detecting arrangement for detecting variation in a carrier frequency of a received carrier signal and a carrier signal controlling arrangement for carrying out control of a carrier transmission for a signal to be transmitted to the mobile station. When the carrier frequency of the received carrier signal varies with variation exceeding a reference value, the carrier frequency variation detecting arrangement produces a carrier frequency variation detected signal. Responsive to the carrier frequency variation detected signal, the carrier signal controlling arrangement extends the burst transmission duration for the burst carrier signal.

As described above, this invention extends the burst transmission duration for the burst carrier signal or a maintaining burst signal when the carrier frequency of the received carrier signal varies with the variation exceeding the reference value. Accordingly, the mobile station can easily carry out an automatic tracking control for the automatic tracking type antenna and can easily maintain a frame synchronization or can easily establish the frame synchronization although the frame synchronization is pulled out. As a result, it is possible to carry out the tracking control in stable and to maintain the frame synchronization in stable. That is, it is possible to carry out carrier activation with channel quality having high reliability secured.

A mobile satellite communication method to which the present invention is applicable carries out communications via a communications satellite between an earth station and a mobile station with an automatic tracking type antenna. The earth station transmits, to the mobile station, a modulated signal into which a carrier signal is modulated by an information signal supplied thereto. The earth station periodically transmits a burst carrier signal having a burst transmission duration to the mobile station when the information signal is not supplied thereto. The earth station receives a received signal from the mobile station. According to an aspect of this invention, the earth station continuously transmits the carrier signal when the earth station cannot establish a frame synchronization for the received signal.

A mobile satellite communications system to which the present invention is applicable carries out communication via a communication satellite between an earth station and a mobile station with an automatic tracking type antenna. The earth station transmits, to the mobile station, a modulated signal into which a carrier signal is modulated by an information signal supplied thereto. The mobile satellite communications system carries out carrier activation where the earth station periodically transmits a burst carrier signal having a burst transmission duration to the mobile station when the information signal is not supplied thereto. The earth station comprises a receiver for receiving a received signal from the mobile station. According to an aspect of this invention, the earth station comprises a carrier signal controlling arrangement for carrying out a carrier transmission control for a signal to be transmitted to the mobile station and a frame synchronizing arrangement for establishing a frame synchronization for the received signal to produce a frame synchronization signal. When the frame synchronizing arrangement cannot establish the frame synchronization due to no reception of the received signal transmitted from the mobile station, the carrier signal controlling arrangement continuously transmits the carrier signal to the mobile station.

With this structure, the earth station continuously transmits the carrier signal without transmitting the burst carrier signal when the earth station cannot establish the frame synchronization for the received signal. Accordingly, the mobile station can easily carry out an automatic tracking control for the automatic tracking type antenna and can easily maintain the frame synchronization or can easily establish the frame synchronization although the frame synchronization is pulled out. As a result, it is possible to carry out the tracking control in stable and to maintain the frame synchronization. That is, it is possible to carry out carrier activation with channel quality having high reliability secured.

A mobile satellite communication method to which the present invention is applicable carries out communications via a communications satellite between an earth station and a mobile station with an automatic tracking type antenna. The earth station transmits, to the mobile station, a modulated signal into which a carrier signal is modulated by an information signal supplied thereto. The mobile satellite communication method carries out carrier activation where the earth station periodically transmits a burst carrier signal having a burst transmission duration to the mobile station when the information signal is not supplied thereto. According to an aspect of this invention, the earth station extends the burst transmission duration of the burst carrier signal when a received signal from the mobile station has a received level which varies with variation exceeding threshold.

A mobile satellite communication system to which the present invention is applicable comprises an earth station, a mobile station with an automatic tracking type antenna, and a communications satellite for mediating communications between the earth station and the mobile station. The earth station comprises a carrier signal controlling arrangement for transmitting, to the mobile station, a modulated signal into which a carrier signal is modulated by an information signal supplied thereto and for periodically transmitting a burst carrier signal having a burst transmission duration to the mobile station when the information signal is not supplied thereto. According to this invention, the earth station comprises a level monitoring arrangement for producing a level variation detected signal when a received signal from the mobile station has a received level which varies with variation exceeding threshold. Responsive to the level variation detected signal, the carrier signal controlling arrangement extends the burst transmission duration for the burst carrier signal.

With this structure, the earth station extends the burst transmission duration for the burst carrier signal when the received level of the received signal varies with the variation exceeding the threshold. Accordingly, the mobile station can easily carry out an automatic tracking control for the automatic tracking type antenna and can easily establish a frame synchronization. As a result, it is possible to carry out the tracking control in stable, to establish the frame synchronization in stable, and to maintain a channel quality with high level. That is, it is possible to carry out carrier activation with reliability of a transmission path secured.

A mobile satellite communication method to which the present invention is applicable carries out communication via a communications satellite between an earth station and a mobile station with a mobile antenna. The earth station transmits, to the mobile station, a modulated signal into which a carrier signal is modulated by an information signal supplied thereto. The earth station periodically transmits a burst carrier signal having a burst transmission duration to the mobile station when the information signal is not supplied thereto. According to an aspect of this invention, the mobile station transmits, to the earth station, a predetermined signal indicating whether or not the mobile antenna is an automatic tracking type antenna to give the earth station notice of the predetermined signal. The earth station extends the burst transmission duration for the burst carrier signal when the earth station receives the predetermined signal indicating that the mobile station is the automatic tracking type antenna.

A mobile satellite communications system to which the present invention is applicable comprises an earth station, a mobile station with a mobile antenna, and a communications satellite for mediating communications between the earth station and the mobile station. The earth station comprises a carrier signal controlling arrangement for transmitting, to the mobile station, a modulated signal into which a carrier signal is modulated by an information signal supplied thereto and for periodically transmitting a burst carrier signal having a burst transmission duration to the mobile station when the information signal is not supplied thereto. According to this invention, the mobile station comprises an antenna type notification arrangement for transmitting, to the earth station, an antenna type notification signal indicating whether or not the mobile antenna is an automatic tracking type antenna. The carrier signal controlling arrangement extends the burst transmission duration for the burst carrier signal on reception of the antenna type notification signal indicating that the mobile antenna is the automatic tracking type antenna.

With this structure, the mobile station gives the earth station notice whether or not the mobile antenna is the automatic tracking type antenna. The earth station extends the burst transmission duration for the burst carrier signal when the earth station receiver notice that the mobile antenna is the automatic tracking type antenna. Accordingly, the mobile station can easily carry out an automatic tracking control for the mobile antenna and can easily establish a frame synchronization. As a result, it is possible to carry out the tracking control in stable, to establish the frame synchronization in stable, and to maintain a channel quality with high level. That is, it is possible to carry out carrier activation with reliability of a transmission path secured.

DESCRIPTION OF THE PREFERRED EMBODIMENTS

Figure 1:
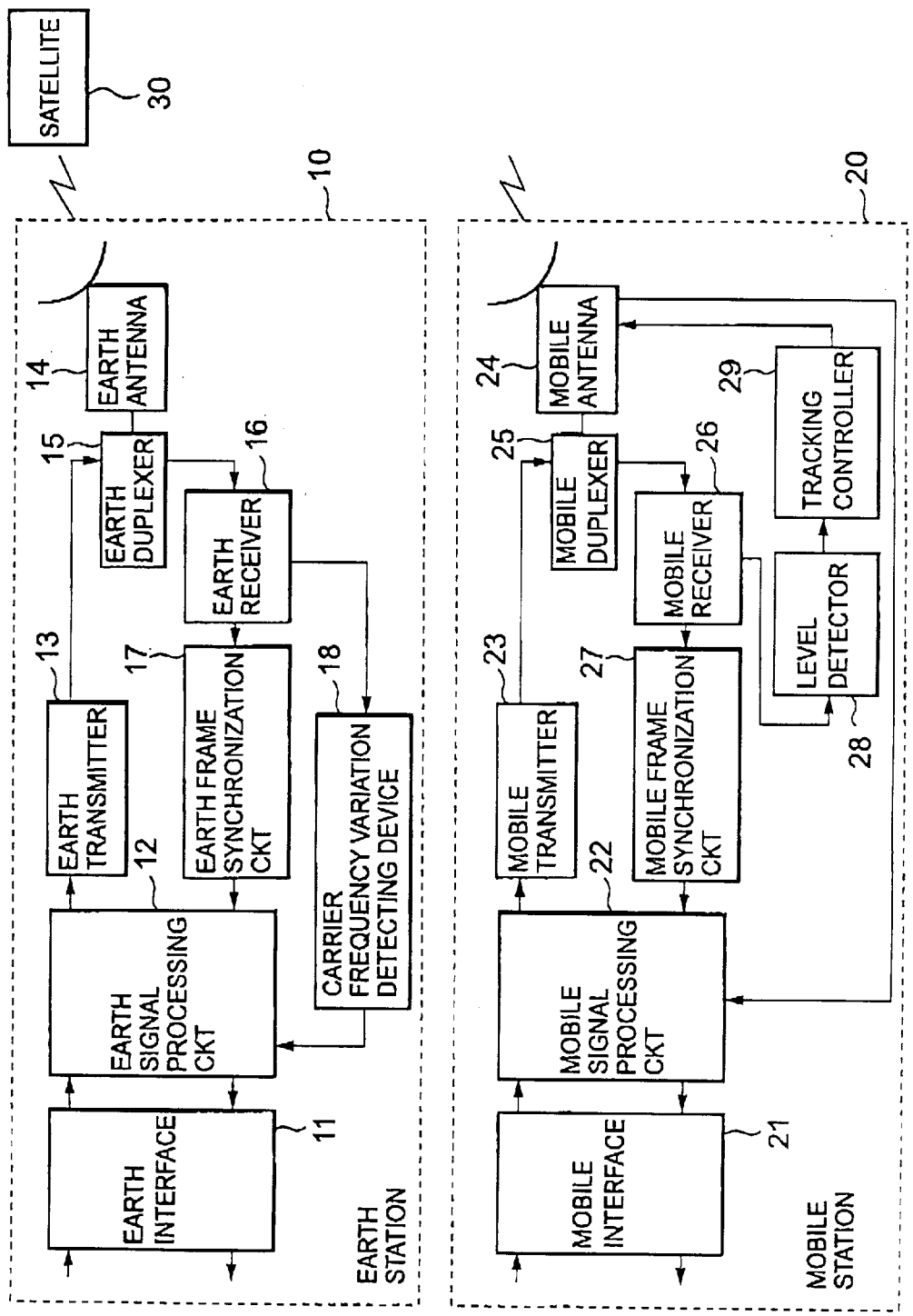
FIG. 1 is a block diagram of a mobile satellite communications system according to a first embodiment of the instant invention.

Referring to FIG. 1, the description will proceed to a mobile satellite communications system according to a first embodiment of this invention. The illustrated mobile satellite communications system comprises an earth station 10, a mobile station 20, and a communications satellite (herein merely called a satellite) 30 for mediating communications between the earth station 10 and the mobile station 20.

The earth station 10 comprises an earth interface 11, an earth signal processing circuit 12, an earth transmitter 13, an earth antenna 14, an earth duplexer 15, an earth receiver 16, an earth frame synchronization circuit 17, and a carrier frequency variation detecting device 18.

On the other hand, the mobile station 20 comprises a mobile interface 21, a mobile signal processing circuit 22, a mobile transmitter 23, a mobile antenna 24, a mobile duplexer 25, a mobile receiver 26, a mobile frame synchronization circuit 27, a level detector 28, and a tracking controller 29.

The earth interface 11 is connected to a general network (not shown) and a leased circuit (not shown) (which are also hereinafter collectively called a ground circuit). The earth interface 11 carries out a protocol control for transmitting and receiving an information signal to and from the ground circuit. The information signal is transmitted to and received from the mobile station 20. The information signal may be a speech signal or a data signal. In addition, the earth interface 11 converts an analog signal supplied from the ground circuit into a digital signal and converts a digital signal received from the mobile station 20 into an analog signal. Furthermore, the earth interface 11 encodes an signal inputted from an external and decodes a received signal from the mobile station 20.

The earth signal processing circuit 12 transmits a line control signal to the earth interface 11 and multiplexes a signal from the earth interface 11 into a multiplexed signal having a data format for transmitting via a satellite communication path. In addition, the earth signal processing circuit 12 serves as a signal processing arrangement according to this invention. That is, the earth signal processing circuit 12 separates a multiplexed signal received at the data format of the satellite communication path to extract an information signal. Furthermore, when the line control signal is included in the multiplexed signal, the earth signal processing circuit 12 analyze the line control signal.

The earth transmitter 13 modulates a carrier signal by the information signal multiplexed by the earth signal processing circuit 12, converts a frequency of the carrier signal into a higher transmission frequency, and amplifies it up to a predetermined transmission power to supply it to the earth duplexer 15.

In addition, a combination of the earth signal processing circuit 12 and the earth transmitter 13 acts as a carrier signal controlling arrangement according to this invention. The carrier signal controlling arrangement processes the information signal inputted via the earth interface 11 from the ground circuit in the manner which is described above, modulates the carrier signal to supply a modulated signal to the earth antenna 14 via the earth duplexer 15 and transmits the modulated signal to the mobile station 20. On the other hand, when the information signal is not supplied, the carrier signal controlling arrangement carries out carrier activation by controlling the earth transmitter 13 by the earth signal processing circuit 12 to periodically transmit a burst carrier signal having a burst transmission duration to the mobile station 20.

Furthermore, responsive to a frequency variation described signal supplied from the carrier frequency variation detecting device 18 in the manner which will later become clear, the carrier signal controlling arrangement extends the burst transmission duration for the burst carrier signal. In the example being illustrated, the carrier signal controlling arrangement continuously transmits the carrier signal when a predetermined time duration elapses while the earth frame synchronization circuit 17 does not produce a synchronization establishment signal. In addition, in the manner which will later become clear, the carrier signal controlling arrangement extends the burst transmission duration for the burst carrier signal when the carrier signal controlling arrangement receives, from the mobile station 20, an antenna type notification signal indicating that the mobile antenna 24 is an automatic tracking type antenna.

The earth duplexer 15 permits alternate use of the earth antenna 14 for both transmitting and receiving. That is, the earth duplexer 15 supplies a signal from the earth transmitter 13 to the earth antenna 14 and supplies a signal from the earth antenna 14 to the earth receiver 16. In addition, the earth antenna 14 is set up so as to turn a principal surface of the earth antenna 14 toward the satellite 30. The earth antenna 14 transmits and receives an electric wave to and from the satellite 30.

The earth receiver 16 amplifies a received signal from the earth antenna 14 via the earth duplexer 15. When the received signal is a frequency multiplexed signal, the earth receiver 16 separates the frequency multiplexed signal into a plurality of separated signals and selects, as a selected signal, one of the separated signals. In addition, the earth receiver 16 converts the selected signal into an intermediate signal having an intermediate frequency. The earth receiver 16 includes a demodulating section (not shown) for demodulating the intermediate signal to regenerate, as a regenerated signal, a signal which the mobile station 20 transmits.

The earth frame synchronization circuit 17 receives the regenerated signal from the earth receiver 16 and detects a unique word in the regenerated signal to establish a frame synchronization. The earth frame synchronization circuit 17 generates a frame synchronization signal serving as a time base on signal processing in the earth signal processing circuit 12. In addition, the earth frame synchronization circuit 17 acts as a synchronization monitoring arrangement for supplying the earth signal processing circuit 12 with the synchronization establishment signal when the frame synchronization is established.

The carrier frequency variation detecting device 18 takes out a carrier frequency information signal (a received carrier signal) having a received carrier frequency from the demodulating section composing a part of the earth receiver 16 to detect a frequency variation in the received carrier signal.

Figure 2:
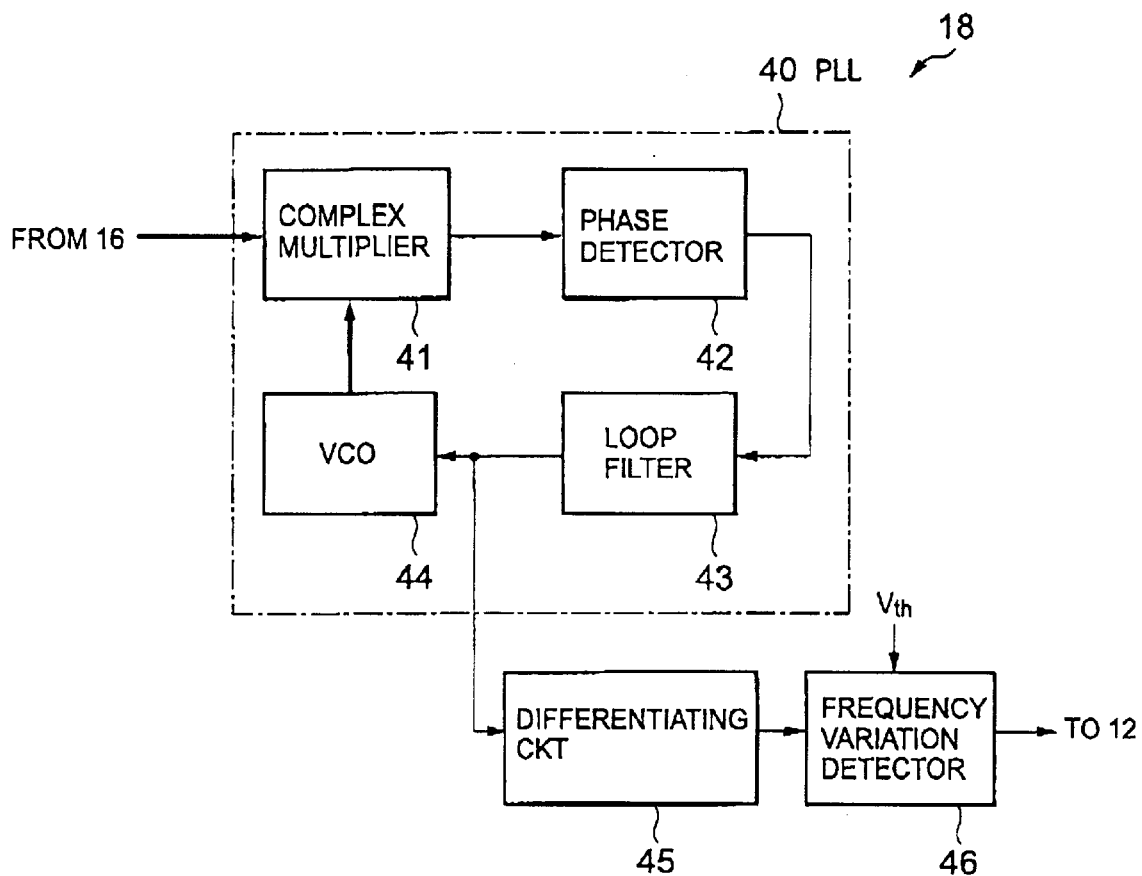
FIG. 2 is a block diagram of a carrier frequency variation detecting device for use in the mobile satellite communications system illustrated in FIG. 1.

Turning to FIG. 2, the description will proceed to the carrier frequency variation detecting device 18. In FIG. 2, a signal line depicted at a thick line represents a quadrature signal (a complex signal). The carrier frequency variation detecting device 18 comprises a phase locked loop (PLL) 40, a differentiating circuit 45, and a frequency variation detector 46. The phase locked loop 40 comprises a complex multiplier 41, a phase detector 42, a loop filter 43, and a voltage controlled oscillator (VCO) 44.

The complex multiplier 41 is supplied with the received carrier signal from the earth receiver 16. In addition, the complex multiplier 41 is supplied with a regenerated carrier signal from the voltage controlled oscillator 44 in the manner which will become clear as the description proceeds. The complex multiplier 41 complex multiplies the received carrier signal by the regenerated carrier signal to produce a multiplied result signal. The multiplied result signal is supplied to the phase detector 42. The phase detector 42 detects a phase error (a phase difference) between the regenerated carrier signal and the received carrier signal on the basis of the multiplexed result signal. The phase detector 42 produces a phase error signal indicative of the phase error.

The phase error signal is supplied to the loop filter 43. The loop filter 43 removes a high frequency component from the phase error signal to produce a control voltage. The control voltage is supplied to the voltage controlled oscillator 44. Responsive to the control voltage, the voltage controlled oscillator 44 generates the regenerated carrier signal having a controllable oscillation frequency.

Connected to the phase locked loop 40, the differentiating circuit 45 differentiates the control voltage to produce a differential voltage. The differentiating circuit 45 is connected to the frequency variation detector 46. The frequency variation detector 46 is supplied with a threshold voltage $V_{th}$. When the differential voltage exceeds the threshold voltage $V_{th}$, the frequency variation detector 46 produces a pulse which is supplied to the earth signal processing circuit 12 as the frequency variation detected signal.

As described above, a combination of the complex multiplier 41, the phase detector 42, the loop filter 43, and the voltage controlled oscillator 44 compose the phase locked loop 40. The phase locked loop 40 catches the received carrier signal and makes the regenerated carrier signal follow so as to synchronize a carrier phase of the received carrier signal. Accordingly, when variation occurs in the received carrier frequency of the received carrier signal due to a doppler effect or a frequency drift of a local oscillator for generating a carrier signal in the satellite transponder or the mobile station 20, a phase shift between the received carrier signal and the regenerated carrier signal occurs and it is observed as the phase error. The control voltage corresponding to the phase error is supplied to the voltage controlled oscillator 44 to control the controllable oscillation frequency of the regenerated carrier signal. In addition, information indicative of the received carrier frequency of the received carrier signal appears as the control voltage of the loop filter 43 owing to following of the phase locked loop 40.

As a result, the differentiating circuit 45 produces the differential voltage indicative of the magnitude of the variation in the received carrier frequency of the received carrier signal. And then, the frequency variation detector 46 supplies the frequency variation detected signal to the earth signal processing circuit 12 when the variation in the received carrier frequency exceeds a threshold.

Turning back to FIG. 1, as described above, the mobile station 20 comprises the mobile interface 21, the mobile signal processing circuit 22, the mobile transmitter 23, the mobile antenna 24, the mobile duplexer 25, the mobile receiver 26, the mobile frame synchronization circuit 27, the level detector 28, and the tracking controller 29.

The mobile interface 21, the mobile signal processing circuit 22, the mobile transmitter 23, the mobile antenna 24, the mobile duplexer 25, the mobile receiver 26, and the mobile frame synchronization circuit 27 are basically similar in structure and operation to the earth interface 11, the earth signal processing circuit 12, the earth transmitter 13, the earth antenna 14, the earth duplexer 15, the earth receiver 16, and the earth frame synchronization circuit 17, respectively.

However, there are few differences between the mobile station 20 and the earth station 10. Specifically, the mobile signal processing circuit 22, the mobile transmitter 23, and the mobile frame synchronization circuit 27 have no function for control of the carrier signal and differ from those in the earth station 10. In addition, the mobile antenna 24 is an automatic tracking type antenna. Furthermore, the mobile interface 21 is connected to a telephone set (a hand set) (not shown), a facsimile equipment (not shown), a date terminal equipment (not shown) such as a personal computer, or the like.

In addition, a combination of the mobile signal processing circuit 22 and the mobile transmitter 23 serves as an antenna type notifying arrangement for transmitting, to the earth station 10, the antenna type notification signal indicating whether or not the mobile antenna 24 is the automatic tracking type antenna.

The level detector 28 detects a level of a mobile received signal which is received by the mobile receiver 26. The level detector 28 produces a level detected signal indicative of the level of the mobile received signal. The level detected signal is supplied to the tracking controller 29. Responsive to the level detected signal, the tracking controller 29 controls a direction of the mobile antenna 24 so that the level of the mobile received signal has the maximum.

Referring to FIGS. 1 and 2, operation of the mobile satellite communications system will be described. It will be assumed that the mobile interface 21 is connected to the telephone set (not shown).

In the mobile station 20, when the telephone set carries out a calling, the mobile signal processing circuit 22 detects the calling through the mobile interface 21 to generate a line control signal for requesting a channel connection of a satellite communication path and sends the line control signal to the mobile transmitter 23. On reception of the line control signal, the mobile transmitter 23 carries out, on the basis of the line control signal, modulation of a carrier signal, multiplexing, and power amplification to supply a modulated signal to the mobile antenna 24 and transmits it to a network management station (not shown).

The network management station assigns a communication channel to the mobile station 20 and the earth station 10. Each of the mobile station 20 and the earth station 10 carries out a predetermined access control using the assigned communication channel.

While carrying out the predetermined access control, the mobile signal processing circuit 22 in the mobile station 20 determines a type of the mobile antenna 24 which is presently used. Inasmuch as the mobile antenna 24 is the automatic tracking type antenna, the mobile signal processing circuit 22 generates the antenna type notification signal indicating that the mobile antenna 24 is the automatic tracking type antenna and transmits it to the earth station 10 through the mobile transmitter 23.

In the earth station 10, the earth signal processing circuit 12 receives the antenna type notification signal. Inasmuch as the antenna type notification signal indicates that the mobile antenna 24 is the automatic tracking type antenna, the earth signal processing circuit 12 sets a long burst transmission duration which is longer than that in a case of a non-tracking antenna on transmitting a burst carrier signal or a maintaining burst signal by controlling the earth transmitter 13.

More specifically, in the mobile satellite communications system illustrated in FIG. 1, inasmuch as the mobile antenna 24 of the mobile station 20 is the automatic tracking type antenna, the earth station 10 transmits the maintaining burst signal having the long burst transmission duration to the mobile station 20. Inasmuch as the mobile station 20 receives the maintaining burst signal having the long burst transmission duration, it is possible to easily carry out an automatic tracking control in the mobile antenna 24 by using the level detector 28 and the tracking controller 29. In addition, the mobile frame synchronization circuit 27 can easily establish the frame synchronization and it is possible to avoid breaking of the channel connection and to rapidly return a line state although the frame synchronization is pulled out without being enable to track. Accordingly, it is possible to carry out the carrier activation with reliability in a communication path secured.

After carrying out the access control, communications are started between the mobile station 20 and the earth station 10 and the earth signal processing circuit 12 in the earth station 10 carries out the carrier activation.

Figure 3:
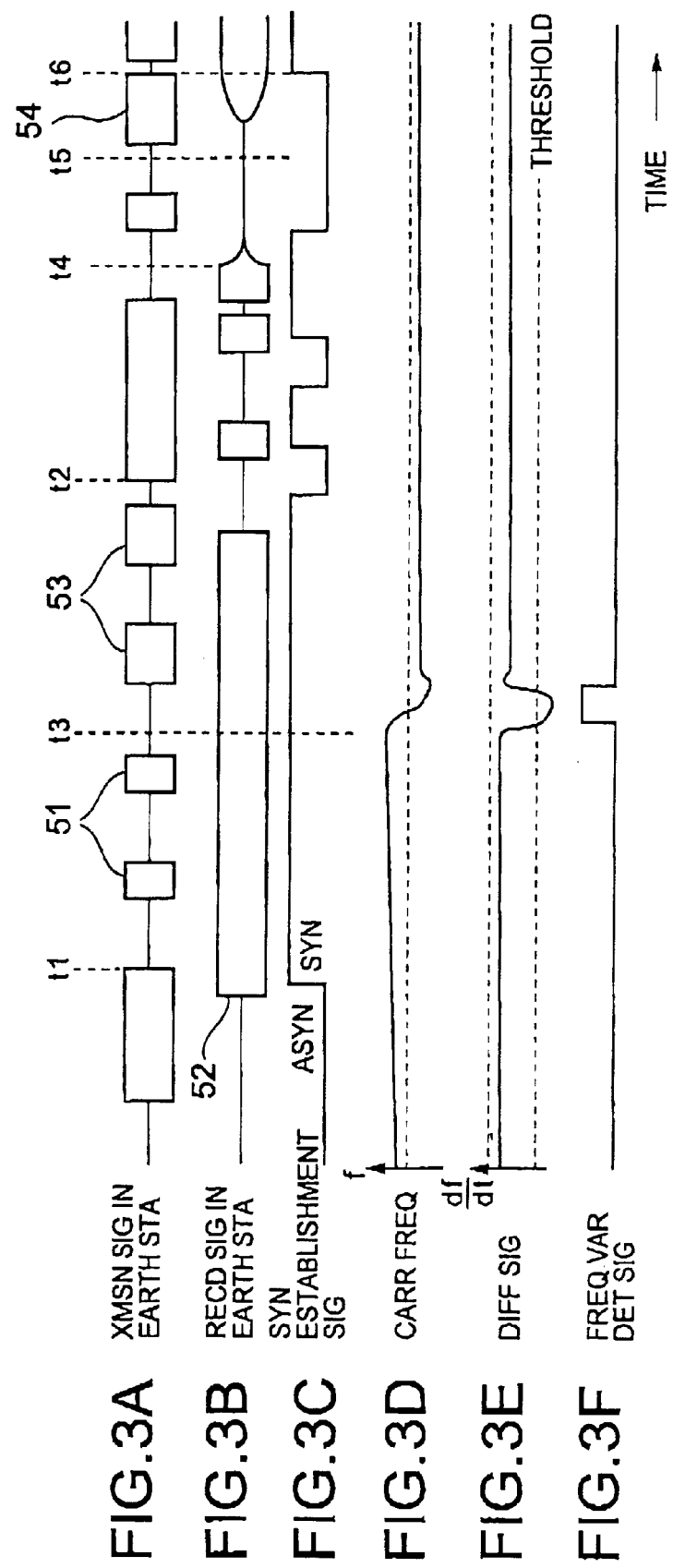
FIGS. 3A through 3F are time charts for use in describing operation of the mobile satellite communications system illustrated in FIG. 1.

Referring to FIGS. 3A through 3F, description will be made about operation related to the carrier activation. FIG. 3A shows a waveform of a transmission signal in the earth station 10 and FIG. 3B shows a waveform of a received signal in the earth station 10. FIG. 3C shows the synchronization establishment signal produced by the earth frame synchronization circuit 17 and FIG. 3D shows the received carrier frequency f of the received carrier signal produced by the earth receiver 16. In addition, FIG. 3E shows a waveform of the differential signal df/dt produced by the differentiating circuit 45 and FIG. 3F shows the frequency variation detected signal produced by the frequency variation detector 46.

As shown in FIG. 3A, in the earth station 10, a speech signal is supplied to the earth interface 11 via the ground circuit up to a time instant t1. The speech signal is multiplexed with other signals by the earth signal processing circuit 12, is power amplified by the earth transmitter 13, and is transmitted to the mobile station 20 via the satellite 30 from the earth antenna 14.

Thereafter, during a time interval between the time instant t1 and a time instant t2, the speech signal is not supplied to the earth station 10. Therefore, the earth signal processing circuit 12 periodically transmits a maintaining burst signal 51 by controlling the earth transmitter 13. The maintaining burst signal 51 has the long duration than that of a normal maintaining burst signal. This is because the mobile antenna 24 of the mobile station 20 is the automatic tracking type antenna.

In addition, as shown in FIG. 3B, during the time interval between the time instant t1 and the time instant t2, in the earth station 10, the earth receiver 16 receives an earth received signal 52 modulated by a speech signal through the earth antenna 14 to regenerate, as a regenerated signal, a signal which the mobile station 20 transmits. The earth frame synchronization circuit 17 establishes the frame synchronization by detecting the unique word in the regenerated signal to produce the frame synchronization signal used as the time base on signal processing in the earth signal processing circuit 12 and to supply it to the earth signal processing circuit 12. In addition, the earth frame synchronization circuit 17 is operable as the synchronization monitoring arrangement. Inasmuch as the frame synchronization is established, the earth frame synchronization circuit 17 supplies the earth signal processing circuit 12 with the synchronization establishment signal having a logic high level as shown in FIG. 3B.

It will presumed that the mobile station 20 changes its moving direction against the satellite 30 at a time instant t3 as shown in FIGS. 3A through 3C. Under the circumstances, the received carrier frequency f of the received carrier signal changes due to the doppler effect as shown in FIG. 3D. The phase locked loop 40 (FIG. 2) follows variation of the received carrier frequency f. As a result, the loop filter 43 produces the control voltage which varies in response to the variation of the received carrier frequency f. Accordingly, the differentiating circuit 45 produces the differential voltage df/dt indicative of the variation of the control voltage or of the magnitude of the variation of the received carrier frequency f. The frequency variation detector 46 supplies the earth signal processing circuit 12 with the frequency variation detected signal when the variation of the received carrier frequency exceeds the threshold.

Responsive to the frequency variation detected signal, the earth signal processing circuit 12 extends the burst transmission duration and transmits a maintaining burst signal 53 having the extended burst transmission duration by controlling the earth transmitter 13.

Accordingly, when the mobile station 20 changes its moving direction against the satellite 30 as mentioned before, it is possible for the mobile station 20 to easily carry out the automatic tracking control of the mobile antenna 24 by using the level detector 28 and the tracking controller 29. It results in the tracking control in stable. In addition, it is possible for the mobile frame synchronization circuit 27 to achieve the frame synchronization in stable. This is because the mobile frame synchronization circuit 27 can maintain the frame synchronization and can rapidly establish the frame synchronization although the frame synchronization is pulled out. As a result, it is possible to carry out the carrier activation with reliability in the communication path secured.

In addition, variation of the received carrier frequency f remarkably occurs due to orbit movement of the satellite 30 in a case where the satellite 30 is a non-geostationary satellite. It is possible to secure the channel connection in stable in such a case. This is because the burst transmission duration is extended in the similar manner.

Thereafter, it will be assumed that the earth received signal attenuates at a time instant t4 as shown in FIG. 3B because of, for example, shadowing or failure of the antenna tracking control in the mobile station 20. In this event, the earth frame synchronization circuit 17 cannot establish the frame synchronization and the earth frame synchronization circuit 17 acting as the synchronization monitoring arrangement stops production of the synchronization establishment signal as shown in FIG. 3C.

As a result, after a predetermined time interval elapses while the synchronization establishment signal is not supplied, that is, at a time instant t5, the earth signal processing circuit 12 makes the earth transmitter 13 continuously transmit a carrier signal 54 by controlling the earth transmitter 13 although the speech signal is not supplied from the ground circuit.

Thereafter, it will be presumed that the earth received signal comes back to the beginning level and then the earth frame synchronization circuit 17 produces the synchronization establishment signal at a time instant t6. Under the circumstances, the earth signal processing circuit 12 stops a continuous transmission of the carrier signal.

In addition, inasmuch as the mobile station 20 transmits a maintaining burst signal in the similar manner as the earth station 10 when the mobile station 20 does not transmit the information signal, it is possible to always establish the frame synchronization if the communication path is normal. Accordingly, that the frame synchronization cannot be established is judged that the shadowing or the failure of the antenna tracking control in the mobile station 20 occur as mentioned before. As a result, it is effective that the earth station 10 continuously transits the carrier signal.

As described above, in the mobile satellite communications system according to the first embodiment of this invention, inasmuch as the carrier signal is continuously transmitted from the earth station 10 when the shadowing or the failure of the antenna tracking control in the mobile station 20 occur, it is possible for the mobile station 20 to return to a communicable state by certainly carrying out the tracking control for the mobile antenna 24 to rapidly turn a direction of the mobile antenna 24 toward the satellite 30 accurately. In addition, it is easy for the mobile frame synchronization circuit 27 to establish the frame synchronization. As a result, it is possible to carry out the carrier activation with reliability in the communication path secured.

Although the description of operation mentioned before had far been described in a case where the speech signal is transmitted and received between the earth station 10 and the mobile station 20, operation of each part in another case where a date signal as the information signal is transmitted and received between the earth station 10 and the mobile station 20 by connecting the facsimile equipment or the data terminal equipment with the mobile interface 21 of the mobile station 20 is basically similar to the above-mentioned case and it is possible to obtain a similar effect.

In addition, although the mobile signal processing circuit 22 detects the type of the mobile antenna 16 to transmit the antenna type notification signal in the above-mentioned first embodiment, the mobile signal processing circuit 22 may preliminarily store information indicative of whether or not the mobile antenna 24 is the automatic tracking type antenna and may generate the antenna type notification signal on the basis of the information to transmit it.

Figure 4:
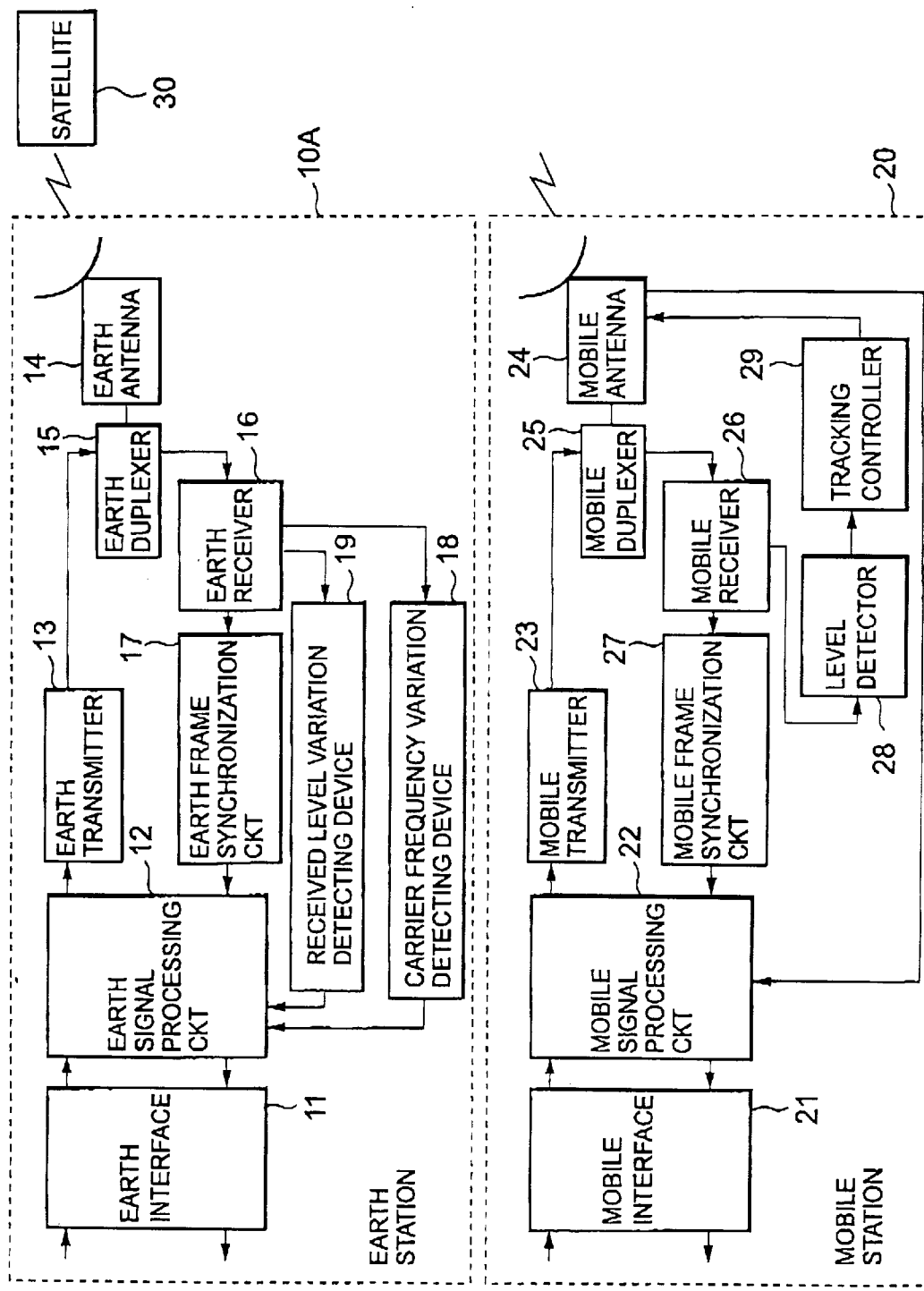
FIG. 4 is a block diagram of a mobile satellite communications system according to a second embodiment of the instant invention.

Referring to FIG. 4, the description will proceed to a mobile satellite communications system according to a second embodiment of this invention. The mobile satellite communications system is similar in structure and operation to that illustrated in FIG. 1 except that the earth station is modified from that illustrated in FIG. 1 as will later become clear. The earth station is therefore depicted at 10A. The earth station 10A is similar in structure and operation to the earth station 10 illustrated in FIG. 1 except that the earth station 10A further comprise a received level variation detecting device 19. In FIG. 4, components similar to those in FIG. 1 are attached with the same reference symbols and the description thereof is therefore omitted herein.

Figure 5:
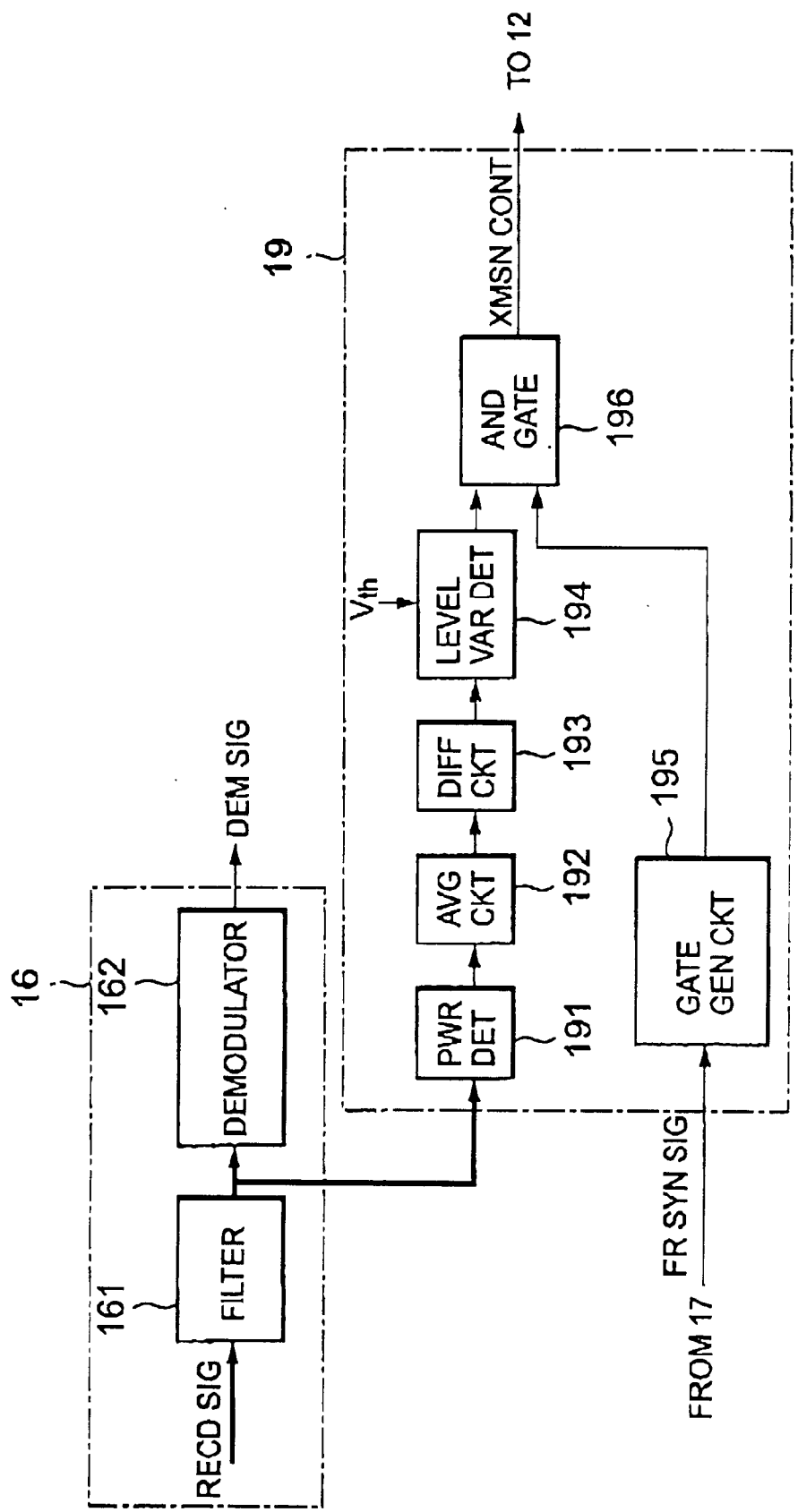
FIG. 5 is a block diagram of a received level variation detecting device for use in the mobile satellite communications system illustrated in FIG. 4.
Figures 6A, 6B:
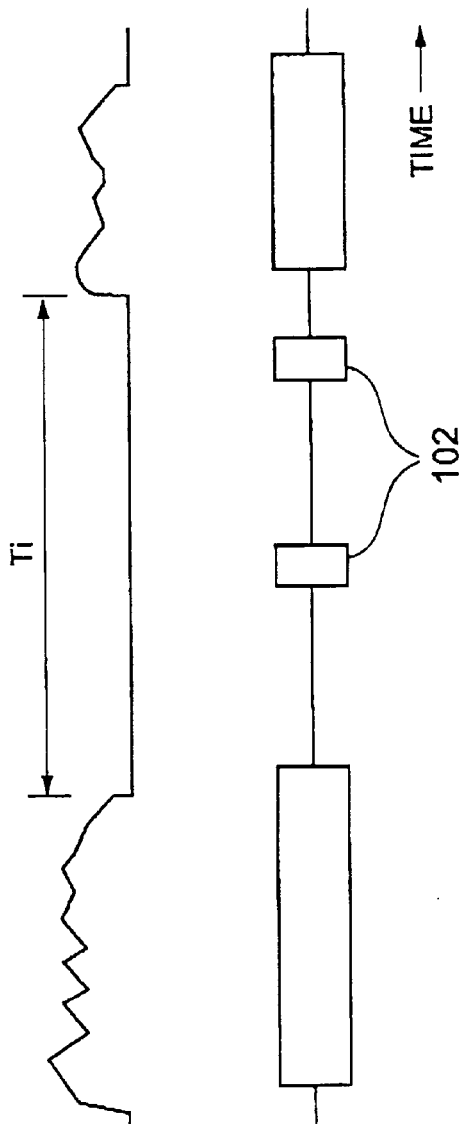
FIGS. 6A and 6B are time charts for showing signals in a case of carrying out voice activation.

Turning to FIG. 5, the description will proceed to the received level variation detecting device 19. In FIG. 5, a signal line depicted at a thick line represents a quadrature signal (a complex signal).

The earth receiver 16 comprises a filter 161 and a demodulator 162. The filter 161 filters the earth received signal into a filtered signal. The filtered signal is supplied to the demodulator 162 and the received level variation detecting device 19. The demodulator 162 demodulates the filtered signal into a demodulated signal.

The received level variation detecting device 19 comprises a power detector 191, an averaging circuit 192, a differentiating circuit 193, a level variation detector 194, a gate generating circuit 195, and an AND gate 196.

The power detector 191 is supplied with the filtered signal from the filter 161. The power detector 191 detects power of the filtered signal to produce a power detected signal. The power detected signal is supplied to the averaging circuit 192. The averaging circuit 192 averages the power detected signal to produce an averaged signal indicative of an average power of the earth received signal. The averaged signal is supplied to the differentiating circuit 195. The differentiating circuit 195 differentiates the averaged signal to produce a differential signal. The differential signal is supplied to the level variation detector 194. On the basis of the differential signal and a predetermined threshold $V_{th}$, the level variation detector 194 detects variation of a received level of the earth received signal to produce a level variation detected signal. The level variation detected signal is supplied to an input terminal of the AND gate 196. The gate generating circuit 195 is supplied with the frame synchronization signal from the earth frame synchronization circuit 17. Responsive to the frame synchronization signal, the gate generating circuit 195 generates a gate signal for detecting variation of the received level. The gate signal is supplied to another input terminal of the AND gate 196.

Operation of the received level variation detecting device 19 will be described. The earth received signal, which is transmitted from the mobile station 20 and is received in the earth station 10A, is supplied to the power detector 191 through the filter 161 in the earth receiver 16. The filtered signal is power detected by the power detector 191 and is averaged by the averaging circuit 192 to obtain the averaged signal indicative of the average power of the earth received signal. The differentiating circuit 193 differentiates the averaged signal to calculate fluctuation in the received power. The level variation detector 194 compares the fluctuation in the received power with the predetermined threshold $V_{th}$. When the fluctuation in the received power exceeds the predetermined threshold $V_{th}$, the level variation detector 194 produces the level variation detected signal which is supplied to the AND gate 196.

On the other hand, the gate generating circuit 195 generates, on the basis of the frame synchronization signal supplied from the earth frame synchronization circuit 17, the gate signal having a logic high level during the received frame synchronization. The gate signal is supplied to the AND gate 196. As a result, supplied from the level variation detector 194, the level variation detected signal is supplied to the earth signal processing circuit 12 (FIG. 4) as an effective signal during the received frame synchronization.

When receiving the level variation detected signal, the earth signal processing circuit 12 sets the burst transmission duration of the maintaining burst signal, which is to be transmitted when the information signal such as the speech signal is not supplied to the earth interface 11, so as to become longer than that in a case of normal.

Accordingly, in the second embodiment of this invention, inasmuch as the burst transmission duration for the maintaining burst signal transmitted from the earth station 10A to the mobile station 20 is set so as to become longer than that in the case of normal when the received level of the earth received signal in the earth station 10A attenuates because the shadowing occurs or the antenna tracking control in the mobile station 20 is not always carried out accurately, it is possible for the mobile station 20 to easily carry out the automatic tracking control in the mobile antenna 24 and it results in the tracking control in stable. In addition, it is possible for the mobile frame synchronization circuit 27 to achieve the frame synchronization in stable. This is because the mobile frame synchronization circuit 27 can maintain the frame synchronization and can rapidly establish the frame synchronization although the frame synchronization is pulled out. Furthermore, it is possible to make the mobile station 20 rapidly return in a normal state although communications are interrupted. As a result, it is possible to carry out the carrier activation with reliability in the communication path secured.

While this invention has thus far been descried in conjunction with a few preferred embodiments thereof, it will now be readily possible for those skilled in the art to put this invention into various other manners.

What is claimed is:

1. A method of carrying out communications via a communications satellite between an earth station and a mobile station with an automatic tracking type antenna, said earth station transmitting, to said mobile station, a modulated signal into which a carrier signal is modulated by an information signal supplied thereto, said method carrying out carrier activation where said earth station periodically transmitting a burst carrier signal having a burst transmission duration to said mobile station when the information signal is not supplied thereto, wherein said method comprises the step of:

extending, in said earth station, the burst transmission duration for the burst carrier signal when said earth station receives, from said mobile station, a carrier signal having a carrier frequency which varies with variation exceeding a reference value.

2. A method of carrying out communications via a communications satellite between an earth station and a mobile station with an automatic tracking type antenna, said earth station transmitting, to said mobile station, a modulated signal into which a carrier signal is modulated by an information signal supplied thereto, said earth station periodically transmitting a burst carrier signal to said mobile station when the information signal is not supplied thereto, said earth station receiving a received signal from said mobile station, wherein said method comprises the step of:

continuously transmitting, from said earth station, the burst carrier signal to said mobile station when said earth station cannot establish a frame synchronization for the received signal.

3. A method of carrying out communications via a communications satellite between an earth station and a mobile station with an automatic tracking type antenna, said earth station transmitting, to said mobile station, a modulated signal into which a carrier signal is modulated by an information signal supplied thereto, said earth station periodically transmitting a burst carrier signal having a burst transmission duration to said mobile station when the information signal is not supplied thereto, said earth station receiving a received signal from said mobile station, wherein said method comprises the step of:

extending, in said earth station, the burst transmission duration for the burst carrier signal when said earth station receives the received signal having a received level which varies with variation exceeding threshold.

4. A method of carrying out communications via a communications satellite between an earth station and a mobile station with a mobile antenna, said earth station transmitting, to said mobile station, a modulated signal into which a carrier signal is modulated by an information signal supplied thereto, said earth station periodically transmitting a burst carrier signal having a burst transmission duration to said mobile station when the information signal is not supplied thereto, wherein said method comprises the steps of:

transmitting, from said mobile station, a predetermined signal indicating whether or not the mobile antenna is an automatic tracking type antenna to give said earth station notice of the predetermined signal; and extending, in said earth station, the burst transmission duration for the burst carrier signal when said earth station receives the predetermined signal indicating that the mobile antenna is the automatic tracking type antenna.

5. In a mobile satellite communications system comprising an earth station, a mobile station with an automatic tracking type antenna, and a communications satellite for mediating communications between said earth station and said mobile station, wherein said earth station comprises:

carrier signal controlling means for transmitting, to said mobile station, a carrier signal with the carrier signal modulated by an information signal supplied thereto, said carrier signal controlling means periodically transmitting a burst carrier signal having a burst transmission duration to said mobile station when the information signal is not supplied thereto; and frequency variation detecting means, connected to said carrier signal controlling means, for detecting that a received carrier signal has a carrier frequency which varies with variation exceeding a reference value, said frequency variation detecting means producing a frequency variation detected signal when the carrier frequency of the received carrier signal varies with the variation exceeding the reference value, said carrier signal controlling means extending the burst transmission duration for the burst carrier signal in response to the frequency variation detected signal.

6. A mobile satellite communications system as claimed in claim 5, wherein said frequency variation detection means comprises:

a phase locked loop including a voltage controlled oscillator for oscillating, responsive to a control voltage, an output signal having an oscillation frequency, said phase locked loop controlling the control voltage on the basis of a phase difference between the received carrier signal and the output signal so as to cancel the phase difference and controlling the oscillation frequency;

a differentiating circuit, connected to said phase locked loop, for differentiating the control voltage to produce a differential signal; and a frequency variation detector, connected to said differentiating circuit and supplied with a threshold, for generating the frequency variation detected signal when the differential signal exceeds the threshold.

7. In a mobile satellite communications system comprising an earth station, a mobile station with an automatic tracking type antenna, and a communication satellite for mediating communications between said earth station and said mobile station, wherein said earth station comprises:

carrier signal controlling means for transmitting, to said mobile station, a carrier signal with the carrier signal modulated by an information signal supplied thereto, said carrier signal controlling means periodically transmitting a burst carrier signal having a burst transmission duration to said mobile station when the information signal is not supplied thereto;

a receiver for receiving a received signal from said mobile station;

frame synchronizing means, connected to said receiver, for establishing a frame synchronization for the received signal to produce a frame synchronization signal, said frame synchronizing means including frame monitoring means for producing a synchronization establishment signal when said frame synchronizing means establishes the frame synchronization; and signal processing means, connected to said frame synchronizing means, for extracting an information signal from the received signal on the basis of the frame synchronization signal, said carrier signal controlling means continuously transmitting the carrier signal when said frame monitoring means does not produce the synchronization establishment signal.

8. A mobile satellite communications system as claimed in claim 7, wherein said carrier signal controlling means continuously transmits the carrier signal after a predetermined time duration elapses while said synchronization monitoring means stops production of the synchronization establishment signal.

9. In a mobile satellite communications system comprising an earth station, a mobile station with an automatic tracking type antenna, and a communications satellite for mediating communications between said earth station and said mobile station, wherein said earth station comprises:

carrier signal controlling means for transmitting, to said mobile station, a carrier signal with the carrier signal modulated by an information signal supplied thereto, said carrier signal controlling means periodically transmitting a burst carrier signal having a burst transmission duration to said mobile station when the information signal is not supplied thereto;

a receiver for receiving a received signal from said mobile station; and a level monitoring means, connected to said receiver and said carrier signal controlling means, for monitoring a received level of the received signal, said level monitoring means producing a level variation detected signal when the received level of the received signal varies with variation exceeding threshold, said carrier signal control means extending the burst transmission duration for the burst carrier signal in response to the level variation detected signal.

10. A mobile satellite communication system as claimed in claim 9, wherein said level monitoring means comprises:

a power detector, connected to said receiver, for detecting power of the received signal to produce a power detected signal;

an averaging circuit, connected to said power detector, for averaging the power detected signal to produce an averaged signal;

a differentiating circuit, connected to said averaging circuit, for differentiating the averaged signal to produce a differential signal; and a level variation detector, connected to said differentiating circuit and supplied with a threshold, for producing the level variation detected signal when said differential signal has a magnitude which exceeds the threshold.

11. In a mobile satellite communications system comprising an earth station, a mobile station with a mobile antenna, and a communications satellite for mediating communications between said earth station and said mobile station, wherein:

said earth station comprises carrier signal controlling means for transmitting, to said mobile station, a carrier signal with the carrier signal modulated by an information signal supplied thereto, said carrier signal controlling means periodically transmitting a burst carrier signal having a burst transmission duration to said mobile station when the information signal is not supplied thereto, said mobile station comprising antenna type notification means for transmitting, to said earth station, an antenna type notification signal indicating whether or not the mobile antenna is an automatic tracking type antenna, said carrier signal controlling means extending the burst transmission duration for the burst carrier signal when the antenna type notification signal indicates that the mobile antenna is the automatic tracking type antenna.

12. A mobile satellite communications system as claimed in claim 11, wherein said antenna type notification means preliminarily stores information indicative of whether or not the mobile antenna is the automatic tracking type antenna, said antenna type notification means generating the antenna type notification signal on the basis of the information to transmit the antenna type notification signal to said earth station.

13. In a mobile satellite communications system comprising an earth station, a mobile station with a mobile antenna, and a communications satellite for mediating communications between said earth station and said mobile station, wherein said earth station comprises:

carrier signal controlling means for transmitting, to said mobile station, a carrier signal with the carrier signal modulated by an information signal supplied thereto, said carrier signal controlling means periodically transmitting a burst carrier signal having a burst transmission duration to said mobile station when the information signal is not supplied thereto;

a receiver for receiving a received signal from said mobile station;

frame synchronization means, connected to said receiver, for establishing a frame synchronization for the received signal to produce a frame synchronization signal;

signal processing means, connected to said frame synchronizing means, for extracting an information signal from the received signal on the basis of the frame synchronization signal;

frequency variation detecting means, connected to said receiver and said carrier signal controlling means, for producing a frequency variation detected signal when a received carrier signal has a carrier frequency which varies with variation exceeding a reference value; and frame monitoring means, included in said frame synchronizing means, for producing a synchronization establishment signal when said frame synchronizing means establishes the frame synchronization, said mobile station comprising antenna type notification means for transmitting, to said earth station, an antenna type notification signal indicative of whether or not the mobile antenna is an automatic tracking type antenna, said carrier signal controlling means extending the burst transmission duration for the burst carrier signal in response to the frequency variation detected signal, said carrier signal controlling means continuously transmitting the carrier signal when said frame monitoring means does not produce the synchronization establishment signal, said carrier signal controlling means extending the burst transmission duration for the burst carrier signal when the antenna type notification signal indicates that the mobile antenna is the automatic tracking type antenna.

14. In a mobile satellite communications system comprising an earth station, a mobile station with a mobile antenna, and a communication satellite for mediating communications between said earth station and said mobile station, wherein said earth station comprises:

carrier signal controlling means for transmitting, to said mobile station, a carrier signal with the carrier signal modulated by an information signal supplied thereto, said carrier signal controlling means periodically transmitting a burst carrier signal having a burst transmission duration to said mobile station when the information signal is not supplied thereto;

a receiver for receiving a received signal from said mobile station;

frame synchronizing means, connected to said receiver, for establishing a frame synchronization for the received signal to produce a frame synchronization signal;

signal processing means, connected to said frame synchronizing means, for extracting an information signal from the received signal on the basis of the frame synchronization signal;

frequency variation detecting means, connected to said receiver and said carrier signal controlling means, for producing a frequency variation detected signal when a received carrier signal has a frequency which varies with variation exceeding a reference value;

frame monitoring means, included in said frame synchronizing means, for producing a synchronization establishment signal when said frame synchronizing means establishes the frame synchronization, and level monitoring means, connected to said receiver and said carrier signal controlling means, for monitoring a received level of the received signal, said level monitoring means producing a level variation detected signal when the received level of the received signal varies with variation exceeding threshold, said mobile station comprising antenna type notification means for transmitting, to said earth station, an antenna type notification signal indicative of whether or not the mobile antenna is an automatic tracking type antenna, said carrier signal controlling means extending the burst transmission duration for the burst carrier signal in response to the frequency variation detected signal, said carrier signal controlling means continuously transmitting the carrier signal when said frame monitoring means does not produce the synchronization establishment signal, said carrier signal controlling means extending the burst transmission duration for the burst carrier signal when the antenna type notification signal indicates that the mobile antenna is the automatic tracking type antenna, said carrier signal controlling means extending the burst transmission duration for the burst carrier signal in response to the level variation detected signal.

* * * * *